United States Patent [11] 3,573,668

[72] Inventors Edward C. Bender;
Donald Hirsch, Matawan, N.J.; Harry R. Rudin, Jr., Thalwil, Switzerland
[21] Appl. No. 781,453
[22] Filed Dec. 5, 1968
[45] Patented Apr. 6, 1971
[73] Assignee Bell Telephone Laboratories, Incorporated
Murray Hill, N.J.

[54] SYSTEM FOR ADAPTIVELY EQUALIZING A DATA SIGNAL HAVING A CLOSED DATA EYE
5 Claims, 1 Drawing Fig.

[52] U.S. Cl. .......... 333/18, 333/70
[51] Int. Cl. .......... H04b 3/04
[50] Field of Search .......... 333/18, 28, 70 (T); 325/42

[56] References Cited
UNITED STATES PATENTS

| | | | |
|---|---|---|---|
| 3,283,063 | 11/1966 | Kawashima et al. .......... | 333/18 UX |
| 3,292,110 | 12/1966 | Becker et al. .......... | 333/18 |
| 3,414,819 | 12/1968 | Lucky .......... | 333/18 |
| 3,414,845 | 12/1968 | Lucky .......... | 333/18 |

*Primary Examiner*—Paul L. Gensler
*Attorneys*—R. J. Guenther and Kenneth B. Hamlin

ABSTRACT: The automatic transversal filter equalizer is modified for improved startup performance in the presence of high initial distortion by providing control signals for adaptive adjustment of tap multipliers from correlations of the polarity of unequalized received data samples, rather than the polarity of data samples in the equalizer output, with the polarity of an error component in the equalizer output.

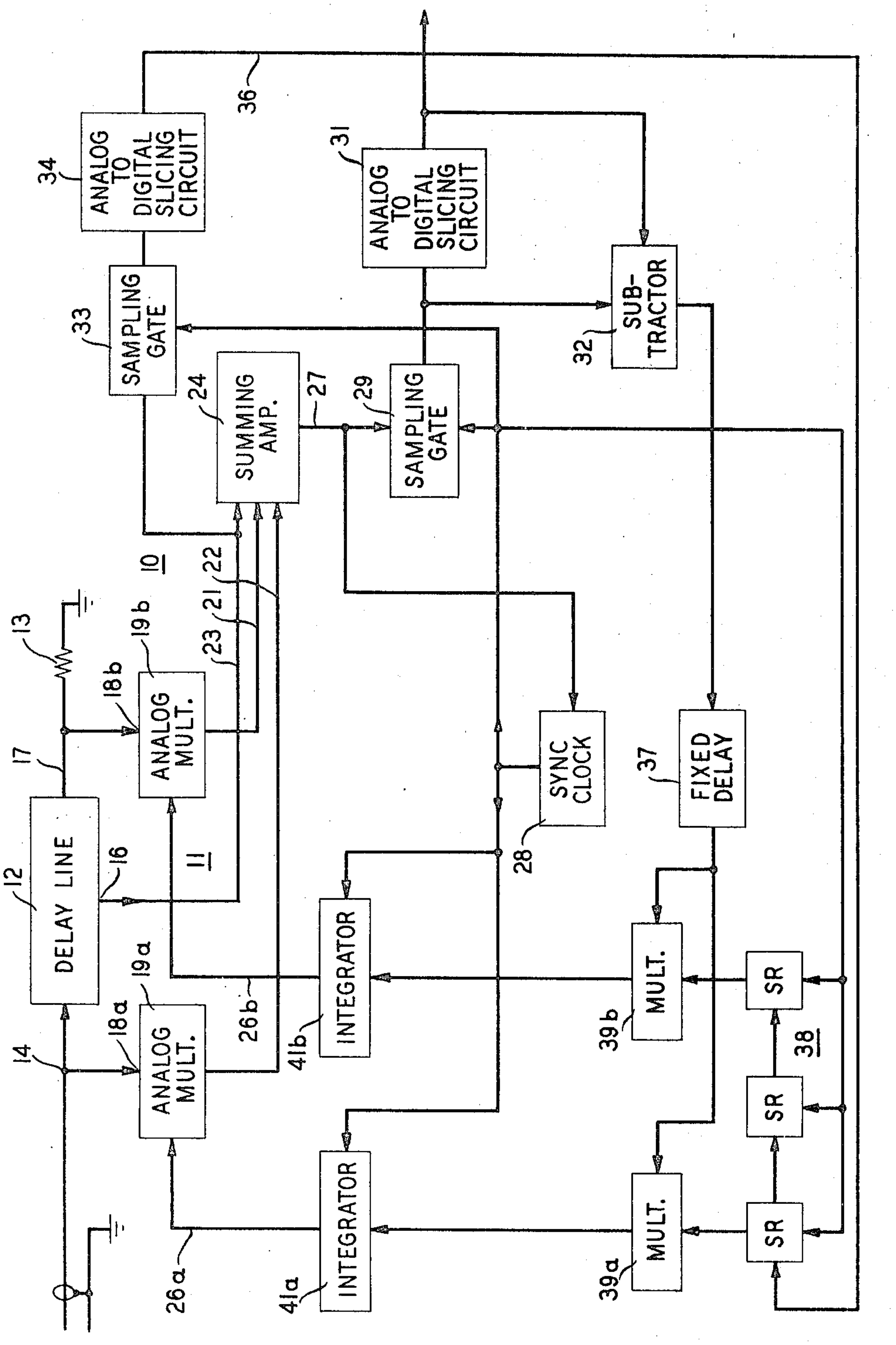
INVENTORS: E. C. BENDER
D. HIRSCH
H. R. RUDIN, JR.
BY: [signature]
ATTORNEY

SYSTEM FOR ADAPTIVELY EQUALIZING A DATA SIGNAL HAVING A CLOSED DATA EYE

FIELD OF THE INVENTION

This invention relates to a system for equalizing a data signal transmitted through a signal distorting bandwidth-limited transmission channel and particularly to an adaptively adjusting signal equalization system for equalizing a received data signal having a closed data eye,

BACKGROUND OF THE INVENTION

Time domain equalizers, such as transversal filters are employed in data communications systems to negate the effect of amplitude and phase distortion introduced by real transmission media. A system disclosed by R. W. Lucky in application, Ser. No. 483,129, entitled "Digital Adaptive Equalizer System," filed Aug. 27, 1965, and now U.S. Pat. No. 3,414,819 issued Dec. 3, 1968, adaptively adjusts tap settings in a transversal filter equalizer by delaying each output error polarity signal and then correlating it with a plurality of equalizer output polarity signals.

It has been found that the above-mentioned Lucky system will adaptively equalize received data signals so long as the received data eye is open. The so-called data eye is obtained by the superposition of sequential synchronous data signals on a test oscilloscope. A data signal is said to have an open data eye when substantially all zero crossings produced by sequential characters therein are clustered at the boundaries of the baud or symbol intervals. If the received data eye is closed, however, zero crossings are dispersed throughout the entire baud interval, and consequently adaptive adjusting circuits tend to adjust the tap settings incorrectly. In fact, with the received data eye closed and the taps initially forced to their proper equalizing settings, the adaptive adjusting circuits may drive the taps to improper settings. This is due to the fact that an equalizer is used to transform a distorted received signal into an undistorted equalized output signal. Correlating the polarities of consecutive equalizer output signals with the polarity of an error signal derived from this same output thus does not alone provide the sufficient information concerning the relationship between the output error and the received signal to minimize the error reliably under all circumstances. The above-mentioned Lucky system works with an open data eye because the polarity of the equalizer output signal is the same as that of the received signal.

In a system disclosed in U.S. Pat. No. 3,403,340 entitled "Automatic Mean-Square Equalizer" which issued to F. K. Becker et al. on Sept. 24, 1968, sequential samples or replicas of the delayed data signal made available at the several taps of a transversal filter equalizer, is correlated with an output error signal derived from the difference between the actual equalizer output signal and a reference signal to provide adjusting signals for the respective taps. This system is effective to equalize some received data signals adaptively when the data eye is closed but requires expensive analogue multipliers at each tap.

BRIEF DESCRIPTION OF THE INVENTION

The present invention provides a circuit for adaptively adjusting tap multipliers, each multiplier being associated with a tap of a transversal filter equalizer. The circuit includes a first digitizing circuit for providing a signal indicative of the polarity of the signal at one of the taps; and a second digitizing circuit for providing a signal indicative of the polarity of the polarity of the difference between the output of the equalizer and the nearest level expected in an equalized data signal. The signal from one of the digitizing circuits is delayed a first time relative to the signal from the other digitizing circuit and correlated therewith to provide a first adjusting signal for adjusting one of the tap multipliers. The signal from the one digitizing circuit is also delayed a second time interval relative to the signal from the other digitizing circuit and correlated therewith to provide a second adjusting signal for adjusting a second of the tap multipliers.

DESCRIPTION OF THE DRAWING

The sole FIGURE is a block diagram of a signal equalization system embodying the principles of the invention.

DETAILED DESCRIPTION

The FIGURE shows an adaptive transversal filter equalization system 10 of the type disclosed in the aforementioned application of R. W. Lucky, modified to incorporate the principles of the present invention. A transversal filter 11 includes a center tap delay line 12 terminated in its characteristic impedance 13 for providing three identical replicas of received signals displaced in time. One replica signal is available at an input terminal 14 of the delay line 12, a second replica signal at a center tap 16 of the delay line 12, and a third replica signal at an output terminal 17 of the delay line 12. It should be understood that a transversal filter utilizing any number of time displaced signals may be employed in the system of this invention. Three have been selected in this instance as an example for ease of explanation.

The input terminal 14 and the output terminal 17 of the delay line 12 are connected to first signal input terminals **18*a* and 18*b* of a pair of analogue multipliers 19*a* and 19*b*, respectively. Leads 21, 22, and 23 connect the multipliers 19*a* and 19*b* and the center tap 16 of the delay line 12, respectively, as inputs to a summing amplifier 24. When appropriate signals are applied to second input leads 26*a* and 26*b* of the analogue multipliers 19*a* and 19*b*, respectively, an equalized signal appears on an output lead 27 of the summing amplifier 24**.

In accordance with common practice, a synchronous clock 28 phase locked to the data signal periodically enables a sampling gate 29 to provide time samples of the equalized signals. By way of example, a system for phase locking a sampling clock to a multilevel data signal is disclosed in an application, now U.S. Pat. No. 3,462,687 issued Aug. 19, 1969, of F. K. Becker-F. W. Lescinsky, Ser. No. 722,137 entitled "Automatic Phase Control for a Multilevel Coded Vestigial Sideband Data System," filed Apr. 17, 1968. A system for phase locking a sampling clock to a binary data signal is disclosed in an application of D. C. Weller, Ser. No. 631,521, filed Apr. 17, 1967, now U.S. Pat. No. 3,479,598 issued Nov. 18, 1969, and entitled "System for Phase Locking Two Pulse Trains." The time samples of the equalized signal are sliced in an analogue-to-digital slicing circuit 31. The slicing circuit 31 may be a Schmitt trigger circuit or a high gain differential amplifier having one of the differential inputs held at a reference slicing level. The slicing circuit 31 provides a digital output signal which is a digitalization, or normalization, of the equalized signal. The output signal has an amplitude equal to the data signal level next to the amplitude of the time samples of the equalized signal.

The sample of the equalized signal appearing at the output terminal of the sampling gate 29 is subtracted from the equalized output signal appearing at the output terminal of binary slicer 31 in subtractor 32 to provide a difference signal, which constitutes an output error polarity signal of the type disclosed by Lucky. The subtractor 32 may be a high gain differential amplifier so that if the signal from the sampling gate 29 exceeds the signal from the slicing circuit 31, a first limit voltage appears at the output of the subtractor 32. If the signal from the slicing circuit 31 exceeds the signal from the sampling circuit 29, a second limit voltage is provided. This operation can also be represented by a linear subtractor followed by a slicing circuit.

The signal on lead 23 from the center tap 16 on the delay line 12 is applied to a sampling gate 33 similar to sampling gate 29. Sampling gate 33 is also enabled by a signal from sync clock 28. The output from sampling gate 33 is passed through an analogue-to-digital slicing circuit 34 similar to analogue-to-digital slicing circuit 31 to provide a signal on lead 36 indicative of the polarity of the signal on lead 23. It should be clear that any of the signals appearing at terminals 14, 16, or 17 can be employed with appropriate shifts in timing to provide the signal appearing on lead 36.

The difference, or output error polarity signal from the subtractor 32 is delayed by a fixed delay element 37 a time interval equal to a multiple of the pulse repetition or band interval of the digital data signal. The delay element 37 can be realized with shift register stages advanced by clock 28. The signal on lead 36 is temporarily stored in a three-stage shift register 38 being advanced once each pulse repetition interval by clock 28.

The information stored in each stage of shift register 38 is sequentially multiplied by the delayed signal from the fixed delay element 37 in a pair of multipliers **39*a* and 39*b*. The multipliers 39*a* and 39*b* isolate the contribution of the intersymbol interference from each of the digital bits preceding and succeeding the bit present at the center tap 16 of the delay line 12. Since the information stored in the stages of the shift register 38 and at the output of fixed delay 37 consists only of 1's and 0's, multipliers 39*a* and 39*b*** can be merely digital exclusive OR circuits.

In an equalizer of the Lucky type, the signal provided by analogue-to-digital slicing circuit 31 would be applied to the shift register 38. It has been found, however, that for many distortion conditions resulting in closed data eyes, such an arrangement is incapable of equalizing properly. The present invention is based upon the realization that employing a digital signal indicative of the input signal polarity for correlation with the difference signal provides an adaptively adjustable equalizer which can equalize a large class of received data signals having closed data eyes without resorting to expensive analogue multiplier circuits.

The product signal from multipliers **39*a* and 39*b* are next applied to integrators 41*a* and 41*b* for providing time-averaged product signals. Since the inputs to the integrators are binary signals, the integrators can be realized with up-down counter stages advanced by a signal from the clock 28. The outputs from integrators 41*a* and 41*b* are applied to inputs 26*a* and 26*b* of the analogue multipliers 19*a* and 19*b*. The The signals applied to the inputs 26*a* and 26*b* of the multipliers 19*a* and 19*b*** are such as to cause the intersymbol interference to be reduced.

It should be understood that the above-described arrangements are merely illustrative of the application of the principles of this invention. Numerous other arrangements may be devised by those skilled in the art without departing from the spirit and scope of this invention.

We claim:

1. In combination:

means responsive to a received data signal for providing a signal indicative of the polarity thereof;

means for sequentially delaying said received data signal for providing delayed data signal replicas;

means for selectively multiplying said delayed data signal replicas;

means for adding said received data signal to selectively multiplied delayed data signal replicas from said multiplying means for providing an equalizer output signal;

means responsive to the difference of the actual level of said equalizer output signal from the nearest of a plurality of reference levels for providing an error polarity signal; and means for correlating said error polarity signal with said received polarity signal to provide control signals for said multiplying means.

2. The combination as defined in claim 1 in which said multiplying means comprise one or more analogue multipliers each having input, output and control terminals;

means for connecting said input terminals to said delaying means to operate on said delayed data signal replicas;

further means for connecting said output terminals to said adding means; and means for applying said control signals to said control terminals.

3. In a transversal filter equalizer including:

means for delaying a received data signal to provide a plurality of delayed replicas of said received data signal;

means for multiplying said delayed data signal replicas by selectively adjustable factors;

means for combining selectively adjusted signal replicas from said multiplying means with said received data signal to provide an equalized output signal; and means for deriving an error polarity signal from the difference between said equalized output signal and a normalized output signal: the improvement facilitating initial adjustment in the presence of high-level distortion comprising means for correlating said error polarity signal with the polarities of successive received signals to provide the selective adjusting factors for said multiplying means.

4. The transversal filter equalizer as defined in claim 3 further comprising:

means for digitizing said received data signal to obtain data polarity signals;

means for storing a plurality of successive data polarity signals for correlation with said error polarity signal; and means for applying signals from said correlating means to said multiplying means.

5. The transversal filter equalizer as defined in claim 3 in which said correlating means comprises one or more "Exclusive-OR" and integrating circuits in cascade.